United States Patent Office 2,894,032
Patented July 7, 1959

2,894,032
METHOD OF PRODUCING KETAZINES

Bernard Rudner, Pittsburgh, Pa., assignor to W. R. Grace & Co., New York, N.Y., a corporation of Connecticut No Drawing. Application September 16, 1958
Serial No. 761,296

9 Claims. (Cl. 260—566)

This invention relates to cyclohexylideneimino compounds and methods of preparing them. In one specific aspect, it relates to the production of ketazines. More particularly, it is concerned with a novel method for the preparation of cyclohexanone azine.

This application is a continuation-in-part of my co-pending application Serial No. 615,504, filed October 12, 1956 which in turn is a continuation-in-part of application Serial No. 537,577, filed September 29, 1955 and application Serial No. 539,692, filed October 10, 1955, both abandoned. Applications Nos. 537,577 and 615,504 relate to methods of preparing cyclohexanechlorimine, cyclohexanone hydrazone hydrate and cyclohexanone azine by the reaction of chloramine and cyclohexanone in the presence of ammonia. Application Serial No. 539,692, like the present case, relates to the preparation of cyclohexanone azine as the sole or major product of the process.

Cyclohexanone azine has proved to be a useful chemical intermediate in the preparation of various commerically important compounds. For example, the azine reacts with hydrogen cyanide to form hydrazo-bis-(1-cyanocyclohexane), which has been used both as a polymerization initiator and as a blowing agent. See U.S. Patent No. 2,580,919 of E. G. Howard.

The present invention is predicated on limiting modifications of the reaction of cyclohexanone and chloramine which result in the formation of cyclohexanone azine as the sole or major reaction product. It has been found that when the reaction process is operated in dilute aqueous solution and in the presence of sufficient inorganic base to maintain alkaline conditions therein, cyclohexanone azine predominates as the product of the reaction.

It is, therefore, an object of the present invention to provide a novel method for the preparation of cyclohexanone azine.

The reaction of chloramine with pure cyclohexanone results in the formation of cyclohexanechlorimine and water. If the water formed in the reaction mixture is allowed to remain, the cyclohexanechlorimine becomes unstable and subsequent reactions can occur within the reaction mixture. Ammonia will react with cyclohexanechlorimine to produce cyclohexanone hydrazone. Alkaline conditions favor a second reaction, that of the hydrazone with additional cyclohexanone to produce cyclohexanone azine. If the ammonium ion is present in small amounts, in such quantities, for example, which would result from the decomposition of chloramine, cyclohexanone azine is the only product obtained. A possible reaction mechanism for this method of producing cyclohexanone azine is demonstrated as follows:

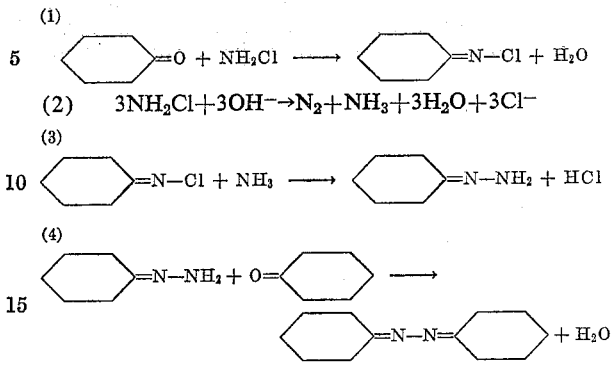

Of course, cyclohexanone must be present in excess of the number of moles of chloramine used.

In the practice of the present invention, chloramine reacts with cyclohexanone to yield cyclohexanechlorimine (Equation 1). The initial reaction mixture is a dilute aqueous solution of chlorimine added to an emulsion of cyclohexanone in a saturated sodium bicarbonate solution. The choice of adding chloramine in an aqueous medium is merely intended to be illustrative, as it may be more convenient to pass gaseous chloramine into the reaction mixture. Chloramine will partially decompose in the presence or hydroxide ions to form ammonia (Equation 2). The ammonia will react with the cyclohexanechlorimine to produce cyclohexanone hydrazone (Equation 3), which in turn will react with additional cyclohexanone to form cyclohexanone azine (Equation 4). Since the ammonia is present only in small amounts in this reaction mixture, all of the cyclohexanone hydrazone formed will be converted to the azine.

The present invention is further illustrated by the following examples:

Example I

A 5 percent emulsion of cyclohexanone in a saturated aqueous sodium bicarbonate solution was treated with an equivalent amount of a 1% aqueous chloramine solution. The reaction mixture was allowed to stand until all of the oxidizing power of the chloramine was gone. Cyclohexanone azine was obtained in a 12 percent yield and it was the only identifiable product in the reaction mixture.

Example II

A generator was constructed to produce a chloramine-ammonia mixture which may be diluted with nitrogen using the process of Sisler et al. U.S. Patent No. 2,710,-248. Such a gas stream was passed into an emulsion of cyclohexanone at room temperature in a saturated aqueous solution of sodium hydroxide. The oxidizing power of the reaction mixture (potassium iodide-starch test) disappeared in one day. The products were isolated and identified as 3% cyclohexanone oxime and 12% cyclohexanone azine. The azine is a tan oil which forms wet crystals at about 27–29° C. and remelts at about 30° C.

I claim:

1. A method of preparing cyclohexanone azine which comprises contacting a dilute aqueous solution of chloramine and ammonia with an aqueous suspension of excess cyclohexanone in the presence of sufficient inorganic base to maintain alkaline conditions therein and recovering the cyclohexanone azine thus formed from the reaction mixture.

2. A method according to claim 1 wherein the inorganic base is an alkali metal hydroxide.

3. A method according to claim 1 wherein the inorganic base is an alkali metal salt of a weak acid.

4. A method of preparing cyclohexanone azine which comprises contacting a chloramine-ammonia gas stream with an aqueous suspension of excess cyclohexanone in the presence of sufficient inorganic base to maintain alkaline conditions therein and recovering the cyclohexanone azine thus formed from the reaction mixture.

5. A method according to claim 4 wherein the chloramine-ammonia gas stream is diluted with ammonia.

6. A method according to claim 4 wherein the inorganic base is an alkali metal hydroxide.

7. A method according to claim 4 wherein the inorganic base is an alkali metal salt of a weak acid.

8. A method of preparing cyclohexanone azine comprising reacting a dilute aqueous solution of chloramine with an aqueous suspension of cyclohexanone in the presence of sodium bicarbonate.

9. A method of preparing cyclohexanone azine comprising passing gaseous chloramine into an aqueous suspension of cyclohexanone in the presence of sodium hydroxide.

No references cited.